United States Patent [19]

Omata

[11] Patent Number: 4,490,886

[45] Date of Patent: Jan. 1, 1985

[54] BINDER FOR LINES, RODS, OR TUBES

[75] Inventor: Nobuaki Omata, Hiroshima, Japan

[73] Assignee: Nifco, Inc., Yokohama, Japan

[21] Appl. No.: 298,869

[22] Filed: Sep. 3, 1981

[30] Foreign Application Priority Data

Sep. 8, 1980 [JP] Japan .......................... 55/126578[U]

[51] Int. Cl.³ .............................................. B65D 63/00
[52] U.S. Cl. .................. 24/16 PB; 248/74.3; 248/74.5
[58] Field of Search ............... 24/16 PB; 248/74 PB, 248/71

[56] References Cited

U.S. PATENT DOCUMENTS

| 3,088,702 | 5/1963 | Orewick et al. | 248/74.5 |
|---|---|---|---|
| 3,121,549 | 2/1964 | Loudon | 248/74.5 |
| 3,471,109 | 10/1969 | Meyer | 24/16 PB |
| 3,473,768 | 10/1969 | Piasecki | 24/16 PB |
| 3,568,262 | 3/1971 | Woldman | 24/16 PB |
| 3,632,070 | 1/1972 | Thayer | 24/16 PB |
| 3,653,096 | 4/1972 | Fernberg | 24/16 PB |
| 3,667,710 | 6/1972 | Moody et al. | 248/74.5 |

*Primary Examiner*—Gene Mancene
*Assistant Examiner*—John G. Weiss
*Attorney, Agent, or Firm*—Trexler, Bushnell & Wolters, Ltd.

[57] ABSTRACT

A plastic binder for binding lines, rods, or tubes into a tight bundle comprises a binding band and a buckle formed at one end of the binding band and provided therein with a slit for insertion of the other end of the binding band. The operability of this binder is notably improved by a pendant portion which is provided in the portion of the binding band between the buckle and an engaging member for fast attachment of the binder to a panel and which is adapted so that the lowermost portion thereof falls below the lower end of the buckle. When the binder is provisionally attached to the panel, the pendant portion causes the buckle to rise amply from the panel surface and facilitates the insertion of the band into the buckle.

7 Claims, 13 Drawing Figures

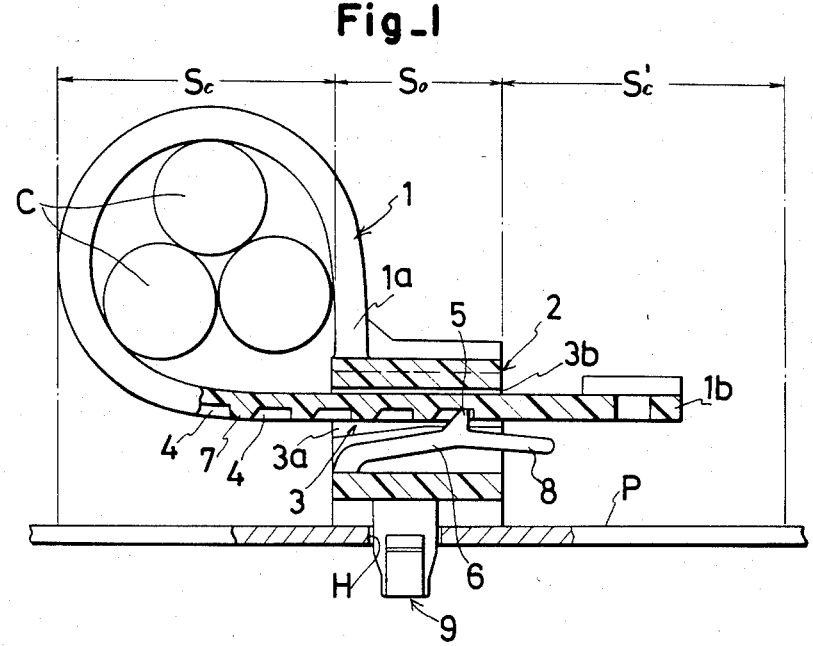
Fig_1
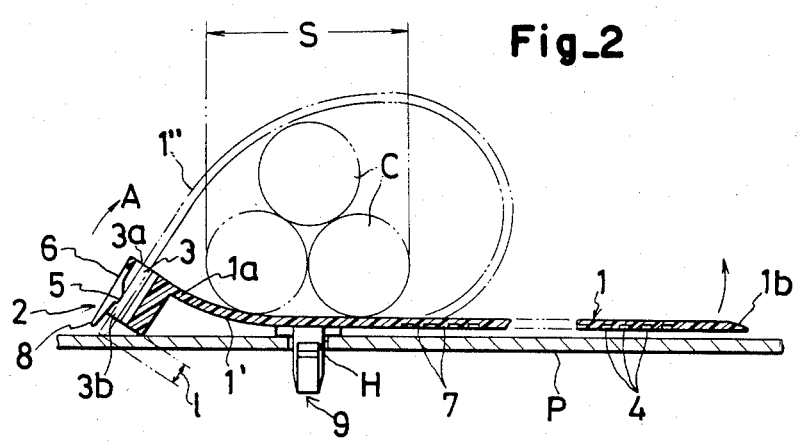
Fig_2
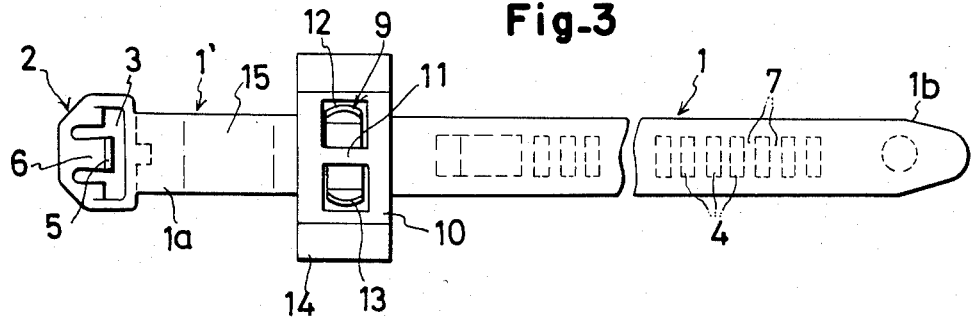
Fig_3

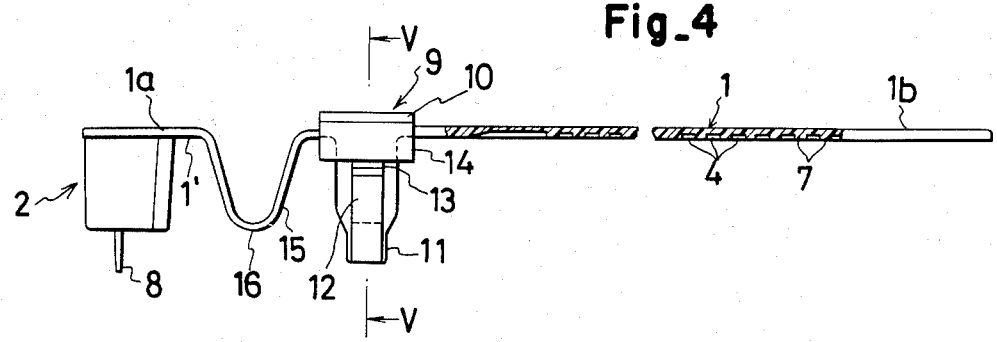
Fig_4
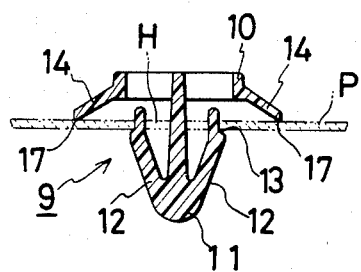
Fig_5
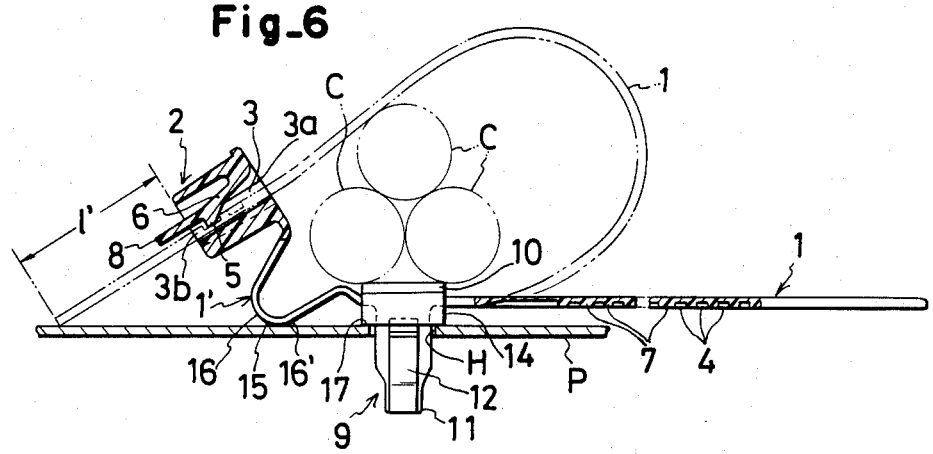
Fig_6

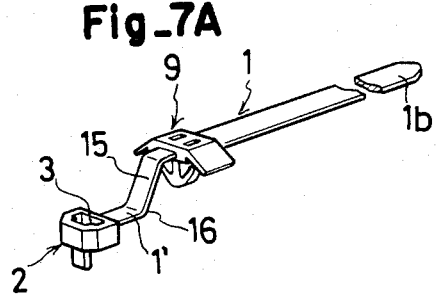
Fig_7A
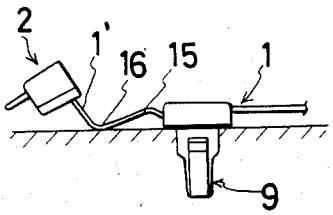
Fig_7B
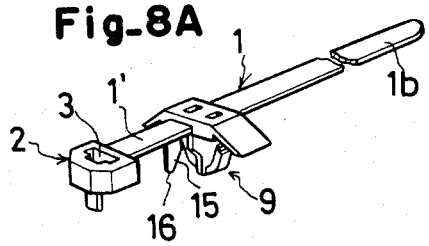
Fig_8A
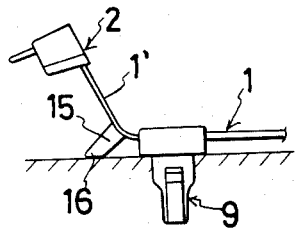
Fig_8B
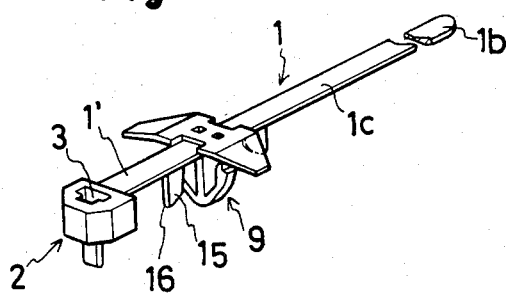
Fig_9A
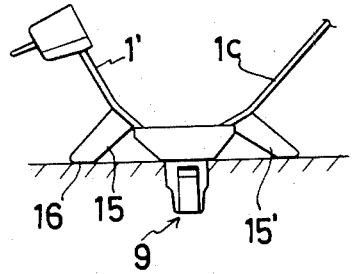
Fig_9B
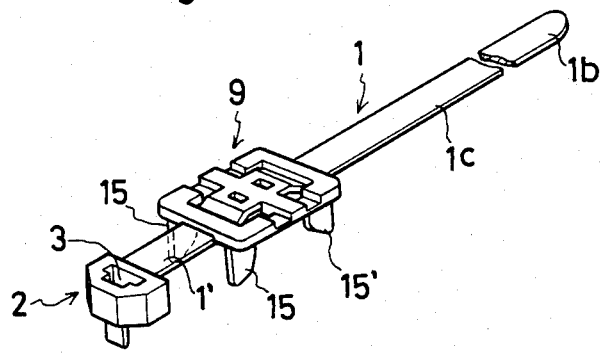
Fig_10

BINDER FOR LINES, RODS, OR TUBES

BACKGROUND OF THE INVENTION

This invention relates to a plastic binder capable of being attached at one portion thereof to a panel, wrapped around lines, rods, or tubes such as electric cables or pipes, and attached to itself thereby bundling such lines, rods, or tubes.

Binders of this kind now available on the market vary widely in design. Generally, however, the binders of this kind have a basic construction which consists of a binding band made of a plastic strip and adapted to be wrapped around slender articles to be bundled and a buckle provided therein with a slit for permitting insertion of the binding band and formed integrally with the binding band. The desired bundling of given slender articles by the binder of this construction is accomplished by wrapping the binding band of this binder around the slender articles, then inserting the free end of the band through the inlet of the slit in the buckle, drawing the emerging free end of the band out of the outlet of the slit, and giving a strong pull to the free end of the band drawn out of the slit thereby binding the slender articles into a tight bundle. For the purpose of keeping the slender articles in a bundled state fast or preventing the binding band from slipping out of the slit in the buckle, the buckle is provided therein with a pawl and the band is provided thereon with a row of fitting recesses or a row of perforations so that, in the course of the bundling operation described above, the buckle and the band may be fastened to each other in a manner not permitting their accidental separation.

The binders of the construction described above are mainly used for binding fast in position cables and other lines distributed within automobiles and electric appliances. Thus, they are destined to be suitably attached fast at prescribed positions on automobile bodies or machine chasses. The binders are, therefore, provided with engaging members adapted to be attached fast to fitting holes bored in advance in the panels. Generally, these engaging members are formed integrally with the buckles or with parts of the bands.

There are times when such conventional binders are to be used for bundling cables within machine interiors having highly limited spaces available for the bundling work. If the binder to be used in this case happens to be provided in the buckle thereof with the engaging member for attachment to the panel, the worker is compelled to insert the binding band through the slit in the buckle while holding the given slender articles such as cables against the buckle with his hand. At this time, since the slender articles hide the inlet of the slit in the buckle, the worker has no alternative but to fumble in the narrow space for the slit before he inserts the band in the slit. Thus, the conventional binders have suffered from very inferior operability. In the case of the binder which has the engaging member for attachment to the panel provided at one point of the binding band thereof, since the buckle is formed integrally at the leading end of the binding band having a straight basic shape, the inlet of the slit in the buckle faces upwardly and the outlet of the slit faces downwardly relative to the panel held in an upright position. When the worker, holding the slender articles in one hand and gripping the band in the other hand, pushes the band through the inlet of the slit in the buckle, the leading end of the band collides with the panel and is not allowed to advance any large distance from the outlet of the slit in the buckle. When the worker subsequently attempts to pull the band out of the outlet of the slit with the one free hand and bind the slender objects into a tight bundle, this work turns out to be a troublesome, almost impossible chore. Users of these binders, desirous to be relieved of this trouble, have urged development of binders which are capable of bundling lines, rods, or tubes with higher workability.

SUMMARY OF THE INVENTION

An object of this invention is to provide a binder for lines, rods, or tubes which is capable of permitting desired bundling of slender articles with high operability.

To accomplish the object described above according to this invention, there is provided a binder which comprises in combination a buckle provided therein with a slit possessing a pawl, a binding band joined integrally at one end thereof to the buckle and adapted to be inserted at the other end thereof into the slit in the buckle in an unreturnable manner, an engaging member formed at one portion of the binding band and adapted to be attached fast to a given panel, and a pendant member formed on the underside of the binding band between the buckle and the engaging member below the lowermost part of the buckle.

Optionally, the pendant member may be formed by causing the portion of the binding band between the buckle and the engaging member to be zigzagged downwardly, or it may be formed as a projection from the lower surface of the binding band. Because of this pendant member, the binding band on the buckle side of the binder which has been fastened through the medium of the engaging member to the panel is raised above the panel and the binding band, if inserted by one hand through the slit in the buckle, is passed through the slit in the buckle and drawn to an ample length from the outlet of the slit. Thus, the binder of this invention permits the bundling work to be carried out with improved efficiency.

The other objects and characteristics of the present invention will become apparent from the further disclosure of the invention to be made herein below with reference to the accompanying drawing.

BRIEF DESCRIPTION OF THE DRAWING

FIGS. 1 and 2 are schematic explanatory diagrams illustrating the constructions of conventional binders.

FIG. 3 is a plan view of the first embodiment of the present invention.

FIG. 4 is a partially cutaway side view of the first embodiment mentioned above.

FIG. 5 is a cross section taken along the line V—V in the diagram of FIG. 4.

FIG. 6 is a side view of the binder as attached fast to a panel, with the important part thereof cut away to illustrate the cross section.

FIGS. 7A, 7B, 8A, 8B, 9A, 9B and 10 are schematic explanatory diagrams illustrating the constructions of modifications of the invention.

DESCRIPTION OF THE PREFERRED EMBODIMENTS

This invention relates to a binder for lines, rods, or tubes. Before the binder of this invention is described, two typical examples of the conventional binders will be described.

In FIGS. 1 and 2, 1 denotes a binding band made of a plastic strip. At one end of the band, a buckle 2 having a slit 3 for the insertion of the band and a pawl 5 provided therein is integrally formed. On one side of the binding band 1 in the direction of the length thereof, there is provided a row of suitably spaced fitting recesses 4. When the band 1 is pierced through the slit 3 in the buckle by inserting the band in the inlet 3a of the buckle and drawing it out of the outlet 3b to bind slender objects C into a tight bundle, the pawl 5 falls into engagement with one of the aforementioned spaced recesses 4 and prevents the band 1 from sliding backward. In the typical examples of FIG. 1 and FIG. 2, the fitting recesses 4 are invariably blind grooves. In some other examples of the conventional binders, they are in the form of holes opening into the opposite sides of the bands. In this case, the fitting recesses have no directionality for the insertion of the pawl relative to the slit 3, making it possible for the band 1 to be inserted, either from the inlet 3a or from the outlet 3b, into the slit 3.

In each of the illustrated examples, the pawl 5 is provided at the leading end of an elastic arm 6 to enjoy ample flexibility. When the band 1 is drawn in its regular direction, therefore, the crosspieces 7 interposed between the adjacent fitting recesses 4 easily ride over the pawl 5. To the leading end of the elastic arm, an operating rod 8 which protrudes from the outlet 3b of the slit is connected. After the binder has tied the articles into a tight bundle, an intentional push given on this operating rod 8 releases the pawl 5 from the fitting recess 4 and dissolves the state of binding.

Described above is the construction concerning the function of binding. In order for the binder itself to be attached fast to a prescribed position such as the inner wall of an automobile body or the chassis of an electric appliance, an engaging member 9 (generally in the form of a plastic fastener) for attachment to the panel is provided at a proper position on the binding band 1 or the buckle 2. In the example of FIG. 1, the fastener 9 serving as an engaging member for fast attachment for the fitting hole H in the panel P is provided on the bottom side of the buckle 2. In the example of FIG. 2, the fastener 9 is provided at a point falling part of the way along the length of the binding band 1 nearer toward the buckle. The plastic fasteners 9 of this kind are available in various forms. Because of their forms, they are called anchor type, canoe type, hook type fasteners, for example.

The construction and form of the binding band, the construction and form of the buckle, and the construction and form of even the fastener 9 widely vary. Roughly, the conventional binders of this class may be divided into those adapted to be attached to the panel P by buckles 2 as illustrated in FIG. 1 and those adapted to be attached at part of the way along the lengths of binding bands to the panel P. This difference gives birth to differences in actual effects. Further, the engaging members incorporated in these binders form causes for various faults.

First, in the case of the binder of FIG. 1 which is adapted to be attached to the fastener 9 by means of the buckle 2, it is only natural that the buckle 2 should attach itself, as though clingingly, to the surface of the panel P and the slit 3 should stretch itself near the panel P almost parallel to the panel. Thus, the inlet 3a of the slit cannot be seen clearly from above. Particularly when the slender articles C to be bundled are brought near the band 1 so as to be bundled, the inlet 3a is completely hidden behind the slender articles C and is kept out of sight.

The worker, after having wrapped the band around the slender articles C, is required to fumble behind these slender articles for the inlet 3a to insert the free end 1b of the band into the inlet 3a. The binder, therefore, suffers from very poor operability.

Further in the case of the binder adapted to be attached to the panel by means of the buckle 2, the buckle 2 itself is formed more rigidly than the band 1. If the slender articles C happen to be bundled directly above this buckle, there is a possibility of the rigid buckle hitting the slender articles and inflicting damage thereto. To avoid this trouble, therefore, the bundling is made in the space $S_c$ on one side of the buckle as illustrated in the drawing. The space which must be provided for the use of this binder is the sum of the space $S_o$ required for the attachment of the buckle itself and the space $S_c$ reserved for the purpose of bundling on one side of the buckle as described above. The latter space $S_c$ does not alway occur on the left side of the buckle as illustrated. There are time when the buckle is required to be attached in a position which is assumed by rotating the buckle by an angle of 180° in a horizontal plane. In this case, a space $S_c'$ roughly equalling the space $S_c$ reserved on the left side for the bundling is required to be set off on the opposite side (right side) across the space $S_o$ to be occupied by the buckle.

This binder, therefore, suffers from poor space factor. It is readily understood that this binder is unfit for bundling slender articles in spaces of complicated shape.

In contrast, in the case of the binder which is provided midway along the length of the binding band 1 with the engaging member 9 for fast attachment to the panel P, since the space directly above the engaging member 9 can be utilized for bundling the slender articles C, the space to be occupied by the slender articles is not changed noticeably even when the direction of the buckle is rotated by 180°. In terms of space factor, therefore, this binder is advantageous. When an automobile or electric appliance destined to use binders of this kind is designed, the spaces allowed for the use of such binders can be estimated with ease. Thus, the binder of this construction has an effect of contributing to freedom of design.

Even the binder which has the engaging member 9 provided midway along the length of the binding band as described above does not prove to be very advantageous in terms of operability. Generally, the binder of this kind is made by molding a plastic material in a die. At the time that the binder is formed and secured as an article of commerce by the user, the binding band 1 is in a roughly straight, flattened state. When this binder is attached by means of the engaging member 9 to the panel P, the binding band 1 stretches substantially along the surface of the panel P and the buckle 2 formed at the other end remains in contact with the surface of the panel P while causing the portion of the band 1' between the buckle 2 and the enaging member to be bent to an extent proportional to the size of the buckle itself.

Now, with the binder kept in the condition described above, the free end 1b of the binding band 1 is picked up, moved round so as to wrap the band 1 around the slender articles C, and then inserted via the inlet 3a into the slit 3 in the buckle. Since the inlet 3a in the binder of FIG. 2 is slanted upwardly and is not hidden behind the slender articles, the initial part of the work of insertion itself is relatively easy as compared with the insertion involved in the binder of FIG. 1. When the band is pushed in from above so that the free end 1b of the band may enter the slit 3 in the buckle 2 through the inlet 3a and emerge from the slit via the outlet 3b, however, the free end 1b of the band which has emerged through the outlet 3b immediately collides with the panel P after advancing only a very small length because the buckle 2 remains in contact with the panel P and the outlet 3b of the slit 3 remains very close to the panel P as described above. The free end protruding at all from the slit is not large enough to be caught by the finger tips. When the worker wishes to tighten up the band 1 to tie the slender articles C into a tight bundle after the free end 1b of the band has been provisionally inserted into the buckle as described above, he is required to lift up the buckle in one hand as shown by the arrow A, give a push along the middle of the band with the other hand, increase the length l of the free end protruding from the outlet 3b to the inlet 3 in the buckle, and thereafter tighten the grip of his fingers on the band during the upward pull of the band.

The two steps of work described above are necessary before the free end 1b of the band is tightened to bind the slender articles into a tight bundle. Moreover, the worker has to use both hands (so that he is unable to keep the slender articles C fast in position). This fault impairs the operability of this binder.

This invention has been developed with a view to overcoming the disadvantages suffered by the conventional binders. It, therefore, is aimed at providing a binder which retains intact the basic construction of the binder of FIG. 2 which employs an advantageous space factor and, at the same time, possesses an additional construction capable of improving workability. To be specific, this invention has a construction such that when the binding band 1 is attached fast to the panel P by means of the engaging member 9 provided intermediate of the length of the band 1, the buckle 2 is allowed to rise to a sufficient height all by itself, the free end 1b of the band consequently is allowed to be inserted into the slit of the buckle by one hand, the space behind the outlet 3b of the slit 3 is enlarged by the rise of the buckle 2, and the free end 1b of the band is allowed even by the initial insertion of the band to protrude to a sufficient length from the outlet 3b.

Now, working examples of this invention will be described below with reference to FIG. 3 and the following diagrams. Insofar as the binders of this type are concerned, the present invention essentially concerns improvements in and concerning the portion 1' of the band of FIG. 2 intervening between the engaging member and the buckle. The other parts of the binder of this invention, therefore, may be copies of the corresponding parts of the binder of FIG. 2. The component parts of the binder of this invention which correspond to those of the binders of FIG. 1 and FIG. 2 are denoted by like numerical symbols. The description of such parts is either omitted to avoid repetition or copied from the description already given.

FIGS. 3 through 6 represent the first embodiment of the present invention. The basic construction of the binder relating to the bundling function is identical with that found in the examples of the conventional binders described above. To be specific, the binder has a binding band 1 made of a plastic strip. One end of this band 1 forms a free end 1b and the other end 1a thereof forms a stationary end of a buckle 2. On one side of the band along the length thereof, the band is provided with a series of fitting recesses 4. The buckle 2 is perforated with a slit 3 for passing the band 1. When the free end 1b of the band is inserted through the inlet 3a of the slit, passed beyond the outlet 3b, and then pulled upwardly, a pawl 5 formed inside the slit is brought into engagement with one of the fitting recesses 4, depending on the particular occasion. Once this engagement is established, the band is prevented from being randomly moved backwardly. The pawl 5 is shaped so that it will permit the band only to move forwardly. If the band tends to move backwardly, the pawl 5 is caught fast on the edge of the fitting recess. This pawl 5 is carried on an elastic arm 6 so that it will readily ride over crosspieces 7 intervening between the fitting recesses while the band is advancing in the forward direction. To this arm 6 is connected an operating rod 8 which protrudes past the outlet 3b of the slit. When necessary, the band 1 can be pulled out of the buckle 2 by giving a push on this operating rod to bend the arm 6 thereby causing the pawl 5 to be released from the fitting recess 4 with which it has been kept in fast engagement. As already pointed out, the elastic arm 6 and the operating rod 8 for the release of the pawl from the fitting recess may be optionally incorporated in the binder to suit the particular occasion. This invention, by nature, does not limit the construction of the parts which relates to the engagement between the buckle 2 and the band 1.

Part of the way along the length of the binding band 1 nearer to the buckle 2, there is provided an engaging member 9 for fast attachment to the panel P. As described above, the engaging member 9 itself may be a simple tapped hole for passing a screw when it is adapted to be fastened to the panel by means of a screw, for example. The engaging member 9 may be in any of the forms known to the art. The illustrated embodiment uses the so-called anchor type fastener as the engaging member. The construction of this particular engaging member will be briefly described by way of illustration.

First, a basal portion 10 to serve as the head portion of the engaging member is integrally formed at a prescribed portion of the binding band 1. It has a wall thickness slightly greater than the thickness of the binding band and protrudes sideways from the opposite edges of the band (in the direction perpendicularly intersecting the direction of the length). As is clear from additional reference to FIG. 5, a leg or shank 11 hangs down from the lower side of the basal portion 10, and elastic engaging pieces 12 rise aslant upwardly from the neighborhood of the leading end of the shank 11. Near the upper ends of the elastic engaging pieces 12, there are provided engaging steps 13 adapted to serve as surfaces for engagement. The fitting hole H in the panel P has an opening smaller than the horizontal distance between the engaging steps 13. When the binder is positioned so that the leading end of the shank 11 of the engaging member 9 is opposed to the fitting hole H and then the binder is pushed down into the fitting hole, the elastic engaging pieces 12 rising from this shank 11 which has forced its way into the fitting hole H continue to descend while they are bent inwardly by the opposite edges of the fitting hole.

As the engaging steps 13 approach the point of slipping out of the fitting hole of the panel P, the elastic engaging pieces 12 regain their original shape owing to the force of elastic recovery built up therein by the force which has kept them bent inwardly. Consequently, the engaging steps 13 are brought into fast engagement with the edges of the fitting hole. At this time, the basal plate 10 because of its relative size is brought into contact with the front side of the panel P. The binder is fastened to the panel P because the panel P is nipped between the basal plate and the engaging steps. In the illustrated embodiment, a pair of elastic skirts 14 are formed at the opposite ends of the basal plate 10. The elastic contact of the lower edges of these skirts 14 with the panel P serves to enhance the force with which the binder is attached to the panel, increase the stability with which the band remains in position, and broaden the allowance of the binder for the variation in the thickness of the panel. These skirts may be omitted when occasion demands. In some fasteners, the engaging steps 13 are not distinctly stepped but are formed with relatively gradual slopes. These engaging slopes suffice for the purpose, so far as they enable the band 1 to be fastened to the panel. The basal plate 10 serving as the head portion need not be clearly distinguished from the band 1.

What characterizes the present invention is the pendant portion 15 which hangs down from the portion 1' of the binding band intervening between the engaging member 9 and the buckle 2.

The essential requirement for the pendant portion 15 is that the lowermost portion 16 thereof should be lower than the neighborhood of the engaging portion 9 which collides with the surface of the panel. In the present embodiment, the neighboring portions of the engaging member 9 used by way of example which are to be brought into contact with the surface of the panel P are the lower edges 17 of the two skirts 14 which diverge downwardly. From the standpoint of this embodiment, the aforementioned requirement is that the lowermost portion 16 of the pendant portion should fall amply below the lower edges 17 of the skirts 14. The choice of the shape for the pendant portion 15 itself is purely a matter of choice. In the embodiments cited later, several pendant portions of different shapes are cited. In the present first embodiment, this pendant portion is formed by causing the portion 1' of the band specified for the provision of the pendant portion 15 to be bent downwardly in the general shape of the letter U.

When the binder incorporating this pendant portion 15 is to be attached to the fitting hole H in the panel, the lowermost portion 16 of this pendant portion 15 comes into contact with the surface of the panel P before the engaging member 9 is brought into fast engagement with the fitting hole H as described above. Consequently, when the engaging member 9 is subsequently pushed down into the fitting hole of the panel and the binder as a whole is brought closer to the surface of the panel, the portion 1' of the band containing the pendant portion 15 is not allowed to descend as it is and the buckle 2 at the leading end of the portion 1' of the band is maintained at a relatively high position. FIG. 6 illustrates the manner in which the engaging member 9 is attached to the fitting hole H. It is noted from the diagram that the portion 1' of the band containing the pendant portion 15 is positively bent upwardly toward the buckle 2 from the position of its contact with the engaging member 9, with the result that the buckle 2 assumes a high position amply separated from the surface of the panel P. In consequence of the bend made by the portion 1' of the band until it has assumed its final position, the portion of the pendant portion 15 which is in contact with the surface of the panel has been shifted from the lowermost portion 16 to a position 16' slightly thereover. Depending on the shape of the pendant portion 15, there are times when the point of contact remains substantially intact (as when the slender articles are in the form of rods, for example). According to the present invention, the buckle 2 is automatically raised and retained in that state thereafter. When the binding band is wrapped around the slender articles C and the free end 1b of the band is inserted into the slit 3 in the buckle, the worker finds this work easy because the inlet 3a of the slit faces toward him and the slit itself has been brought closer toward him. Further, when the band is pushed into the slit in one motion, the length 1' of the band protruding from the outlet 3b of the slit can be amply increased as indicated by the chain line in FIG. 6 because there is reserved a large space between the outlet 3b and the surface of the panel. When the worker pinches the protruding end of the band and pulls it up, he is not required to lift up the buckle 2 and give another push to the band until the protruding end of the band reaches a length sufficient to be pinched as inevitably involved in the binder of the conventional construction. Of course, the whole work described above can be performed with one hand, and the worker is free to use the other hand for keeping the slender articles C in their bundled condition. Thus, the binder of this invention enjoys notably improved operability.

The exent to which the buckle 2 is allowed to rise after the binding band has been fastened to the panel is a question of design which relies on the length of the pendant portion 15 and the length of the portion 1' of the band, for example.

FIGS. 7-10 illustrate several modifications of the pendant portion 15 in terms of form or design.

In the modification illustrated in FIG. 7A, the pendant portion 15 is formed by first bending downwardly the portion 1' of the band intervening between the buckle 2 and the engaging member 9 and shaping the leading end of the bend to give rise to a horizontal, lowermost portion 16. During the attachment of the binder to the panel P, therefore, the lowermost portion of the buckle 2 is the first to collide with the panel. After the forced insertion has progressed to a certain extent, the lowermost portion 16 of the pendant portion 15 begins to come into contact with the panel. Eventually, the neighborhood of the lowermost portion 16 of the pendant portion comes into full contact with the panel and causes the buckle 2 to rise in much the same way as the first embodiment, as illustrated in FIG. 7B.

In the modification illustrated in FIG. 8A, the portion 1' of the band is roughly flat. The pendant portion 15 is separately formed in the form of a fin-like protrusion on the underside of the flat portion 1'. As illustrated in FIG. 8B, the same effect as in any of the preceding embodiments can be obtained by this modification.

FIGS. 9A and B illustrate a modification reflecting a still more desirable arrangement. In this arrangement, the portion 1c of the binding band 1 extending from the engaging member 9 to the free end 1b is adapted to be raised aslant upwardly at the time that the binder is fastened to the panel. In this embodiment, a second pendant portion 15' is provided on the underside of the portion 1c of the band near the engaging member 9 on the side of the free end 1b. By virtue of the second pendant portion 15', the motion of pinching the free end 1b of the band for the wrapping of the band around the slender articles can be omitted or made easier. Thus, the binder enjoys still higher operability.

FIG. 10 illustrates a modification in which the pendant portions 15, 15' are each composed of a pair of pieces separated in the direction of the width of the band. The portion of the band containing these pendant portions 15, 15' (one of the pendant portions 15' is hidden from view) has a rather complicated shape of the three sides of a square because of the convenience of design. This shape is not an essential requirement.

At any rate, this invention improves the operability of the plastic binder which is adapted to be attached to a panel and ties lines, rods, or tubes into a tight bundle. In an application in which a multiplicity of such binders are used in one machine, this invention permits ample cuts in the labor and time involved in the operation. This invention, therefore, produces an outstanding effect.

What is claimed is:

1. In a plastic binder for lines, rods or tubes, comprising in combination a binding band of the shape of a substantially planar strip having a free end at one end thereof and a buckle provided at the other end thereof, said buckle provided with a slit substantially perpendicular to said strip for enabling said binding band to be inserted in the direction of said free end thereof via the inlet of said slit and drawn out via the outlet of said slit, said binding band provided on one side thereof in the direction of its length with a plurality of spaced fitting recesses adapted to be brought into unreturnable engagement with a pawl provided inside said slit of the buckle, and said binding band provided intermediate of the length thereof and substantially closer to said buckle than to said free end with an engaging member for attachment to a panel and having a panel engaging portion, said binding band thereby having a relatively short portion interconnecting said buckle and said engaging member and a relatively long portion for encircling said lines, rods or tubes, the improvement wherein said plastic binder further comprises, in the relatively short portion of the band between said engaging member and said buckle, at least one pendant portion spaced from the engaging member adapted so that the lowermost portion thereof before attachment of the band to a panel extends below the plane of said band and falls below the panel engaging portion of said engaging member to engage said panel and thereby to deflect said buckle away from said panel for ready insertion of said free end through said buckle upon engagement of said engaging portion with said panel.

2. The binder according to claim 1, wherein the pendant portion is formed by the relatively short portion of the band between said engaging member and said buckle being bent downwardly in the shape of the letter U.

3. The binder according to claim 1, wherein the pendant portion is formed by the relatively short portion of the band between said engaging member and said buckle being bent downwardly and the leading end of the bend forming a horizontal lowermost portion.

4. The binder according to claim 1, wherein the pendant portion comprises a fin-like protrusion from the underside of the relatively short portion of the band between said engaging member and said buckle.

5. The binder according to claim 4, and further comprising a second fin-like protrusion on the underside of the portion of the band between said engaging member and the free end side.

6. The binder according to claim 4, and further comprising a second fin-like protrusion, wherein said fin-like protrusions are formed at the opposite sides of the band.

7. The binder according to claim 5 wherein said second pendant portion is formed in the form of a pair of pendant pieces at the opposite sides of the band.

* * * * *